(12) United States Patent
Ballard

(10) Patent No.: US 8,433,921 B2
(45) Date of Patent: Apr. 30, 2013

(54) OBJECT AUTHENTICATION SYSTEM

(75) Inventor: Claudio R. Ballard, Fort Lauderdale, FL (US)

(73) Assignee: Datatreasury Corporation, Plano, TX (US)

( * ) Notice: Subject to any disclaimer, the term of this patent is extended or adjusted under 35 U.S.C. 154(b) by 359 days.

(21) Appl. No.: 12/787,236

(22) Filed: May 25, 2010

(65) Prior Publication Data

US 2010/0321155 A1    Dec. 23, 2010

Related U.S. Application Data

(66) Continuation of application No. 11/014,368, filed on Dec. 16, 2004, now Pat. No. 7,725,732, Substitute for application No. 60/529,922, filed on Dec. 16, 2003.

(51) Int. Cl.
    *H04L 9/00*    (2006.01)
(52) U.S. Cl.
    USPC .......................................................... 713/186
(58) Field of Classification Search .................. 713/168, 713/170, 182, 186; 726/6, 7, 18, 19
    See application file for complete search history.

(56) References Cited

U.S. PATENT DOCUMENTS

| | | | |
|---|---|---|---|
| 5,613,012 | A | 3/1997 | Hoffman et al. |
| 5,615,277 | A | 3/1997 | Hoffman |
| 5,870,723 | A | 2/1999 | Pare, Jr. et al. |
| 5,910,988 | A | 6/1999 | Ballard |
| 6,032,137 | A | 2/2000 | Ballard |
| 6,263,447 | B1 | 7/2001 | French et al. |
| 6,269,348 | B1 | 7/2001 | Pare, Jr. et al. |
| 6,282,658 | B2 | 8/2001 | French et al. |
| 6,321,339 | B1 | 11/2001 | French et al. |
| 6,366,682 | B1 | 4/2002 | Hoffman et al. |
| 6,397,198 | B1 | 5/2002 | Hoffman et al. |
| 6,411,728 | B1 | 6/2002 | Lee et al. |
| 2003/0225693 | A1 | 12/2003 | Ballard et al. |
| 2004/0158723 | A1 | 8/2004 | Root |
| 2008/0034209 | A1* | 2/2008 | Dickinson et al. ............ 713/168 |

* cited by examiner

*Primary Examiner* — Beemnet Dada
(74) *Attorney, Agent, or Firm* — Hershkovitz & Associates LLC; Abe Hershkovitz

(57) ABSTRACT

A system employing enrollment information and the quality of the enrollment information. The enrollment information includes data unique to the identification of a person. The system also stores biometric sensor quality information. When a person seeks to authenticate his/her identity, the sensor transmits the sensor quality data along with the biometric attribute data to the system. The transmitted data is correlated with the enrollment data, and quality of the enrollment data, to produce a score indicative of the probability of a correct identification.

2 Claims, 2 Drawing Sheets

OBJECT AUTHENTICATION SYSTEM

CROSS-REFERENCE TO RELATED APPLICATIONS

This application is a continuation of U.S. application Ser. No. 11/014,368, filed Dec. 16, 2004, which claims the benefit of U.S. Provisional Application No. 60/529,922, filed Dec. 16, 2003.

U.S. application Ser. No. 11/014,368, entitled OBJECT AUTHENTICATION SYSTEM, issued as U.S. Pat. No. 7,725,732 on May 25, 2010. U.S. Pat. No. 7,725,732 is incorporated by reference herein.

TECHNICAL FIELD

The present invention relates in general to the authentication of the identity of objects, and more particularly to the authentication of a person's identity using a biometric repository.

BACKGROUND

Upon birth, infants are given a name to provide a means of identifying them throughout their lives. A person's name is generally unique, but not always. However, each person has a number of physical and behavioral characteristics that do make him/her unique as to all other persons on the earth. Even identical twins have physical characteristics that are capable of distinguishing one twin from the other.

It has been customary for most individuals to provide some type of identification in order to proceed with some want or desire. Some situations require only the simple facial recognition before they can proceed. Other situations require a documentary type of identification, such as a driver's license or other official identification. In other environments where a high degree of security is required in order to prevent unauthorized entry, people are preauthorized and assigned a special pass. Various types of passes have a magnetic strip with a code which, when sensed by a card swipe device, and checked with a database storing all of the authorized codes, allows entry of the person having possession of the pass.

Unique numbers have been widely used to identify persons and distinguish each person from the others in the financial field. Bank account numbers are used by banks and savings institutions to uniquely identify the customers. Credit card numbers are used by credit lending institutions to identify their customers and clients. Social Security numbers are assigned by the United States federal government to each citizen to identify the citizens and maintain an account of funds that may be used by the individuals upon retirement from work. Every utility provider and other vendor assign each customer an account number which is the index used for accessing the customers' records.

A necessary item for the personal and professional fulfillment of many individuals is a computer of one type or another. In a majority of situations, a password is required in order to prevent unauthorized persons from operating another person's computer. In this specialized age of information, the access to information by authorized persons has become extremely important. The administration costs of many businesses have become significant in administering passwords to allow authorized persons access to predefined information, and prevent others from gaining access thereto.

In all of the foregoing methods for assigning an identification to individuals, there exist ways to circumvent the uniqueness of the identification. If some types of identification are lost by the original owner, and found by a stranger, the possession by the stranger of the identification is many times sufficient to allow the stranger to gain access to the original owner's rights associated with the identification. In other instances, the knowledge of another's identification number is sufficient to allow unauthorized access or use provided by the identification number. While the facial identification of a person is a very good indicia of an individual, people often require access to a product or service without being personally present. In addition, the identification by personal recognition of facial features by an attendant also requires that the attendant have stored in available records other correct and reliable information including a picture and other identifying features of the individuals of interest. Because of the threat of terrorism, the federal government presently requires each airline passenger to present some form of picture identification granted by a reliable office of the state or federal government.

It is generally recognized that the greater the risk of loss, the greater the security requirements become. In other words, when large sums of currency are being transferred, financial institutions require a highly secure means of transferring the funds, both as to the financial transaction network itself, and also with respect to the persons using and controlling the financial network. Highly secret environments, both of the government and commercial types, require higher levels of security in ascertaining that each individual is who he/she purports to be.

When the security requirements are stringent, reliance is often placed on more sophisticated means of verifying the identity of individuals. Fingerprints are a means of verifying the identity of individuals. Other technological advancements have allowed unique personal identifications to be made by retina scans, iris scans, blood vein mapping, voice scans, etc., all of which are highly reliable, but require specialized equipment that is not cost effective for every potential user. In addition, there is not available a database of these unique physical features for each person. It is realized that in order to sense the physical feature of interest and ascertain that the person is who he/she purports to be, a comparison must be made between the sensed physical feature and data previously stored in a reliable database relating to the person's unique physical feature.

From the foregoing, it can be seen that the reliability of the records or database is of vital importance in verifying the identity of a person. In other words, unscrupulous persons can alter the records or the database to allow a false positive identification to be made. The communication link between the database and the remote site requesting the identification information must also be secure and reliable. If the communication link is not secure, then it is possible that a request for identification information can be intentionally rerouted, and false identification information can be introduced to respond to the request. The ability of persons highly adept with computer techniques to spy on networks and then to hack into the network to find information represents a constant danger to electronic networks and equipment.

Identity theft is possible only because information can be easily obtained from a victim, and used by a thief purporting to be the victim. In addition, the fraud perpetrated by the thief is unintentionally allowed to be continued by merchants and clerks who are either lax in requiring the proper identification to be presented, or lack the proper database of identification information for comparison with the identity data presented by the thief. The scope of damage resulting from identity theft is enormous and continues to expand because of the lack of better identification verification techniques, and because the burden of loss is presently accepted by the merchants and consumers without a unified protest.

It can be seen from the foregoing that a need exists for improving the quality of identification of persons. Another need exists for a method of associating the level of security required by the situation, with a trust level of the identification sensor which senses a person's unique characteristics. Another need exists for providing a highly reliable enrollment database which stores the identification characteristics of persons, and which stores the trust levels of the various types of biometric sensors. Another need exists for a method of correlating the enrollment data of a person with the trust level of the sensor and providing a response concerning a score representing the accuracy that the person is who he/she purports to be.

SUMMARY

In accordance with an important feature of the invention, there is disclosed a biometric repository adapted for storing identification information of all types, and for storing a trust level regarding the quality of validity of the identification information. The biometric repository also stores information concerning the trust level of the various types of biometric sensors. In response to a request from a remote site for authentication of identification of a person, the person's biometric attributes are sensed by a sensor, and the biometric data and type of sensor are transmitted to the repository. The repository then compares the received biometric data with the stored biometric data to determine if a match exists. If the comparison is affirmative, the repository also correlates the trust level of the stored biometric information with the trust level of biometric sensor at the remote site and provides a score as to the accuracy of the identification.

According to another feature of the invention, identity authentication is not only based on whether a match exists between the prerecorded identification information and sensed identification data, but also on the quality of the prestored identification information and the sensed identification data.

According to an embodiment of the invention, disclosed is a method of authenticating an identity of an object, including the steps of storing identification information in a database, receiving identification data of the object and comparing the received identification data with the stored identification information; and using a trust value of the stored identification information and the comparison to provide a conclusion as to the identity of the object.

In accordance with another embodiment, disclosed is a method of authenticating an identity of an object, which includes the steps of storing enrollment identification information in a database in association with a trust value indicating a quality of the identification information; storing object sensor data in a database in association with a trust value indicating a quality of the sensor; and using the trust values of the identification information and the object sensor in determining the accuracy of the identity of the object.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION

Figure 1:
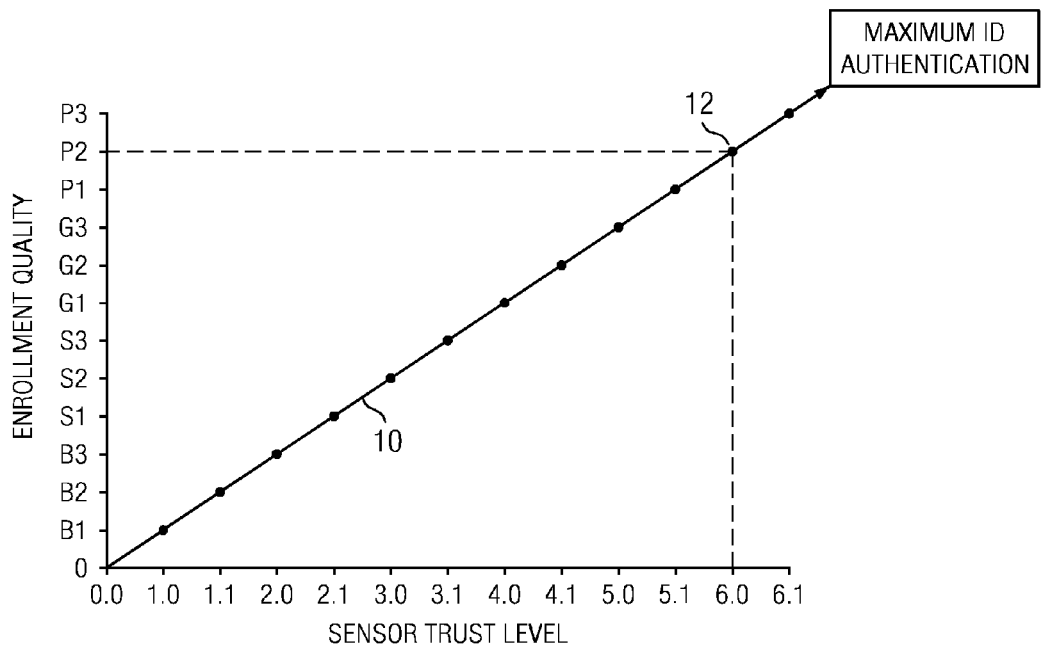
FIG. 1 graphically depicts the enrollment quality parameter versus the sensor trust level, and a resulting score on the sloped line.

In accordance with the invention, a database or repository maintains information that serves to uniquely identify objects, including persons. This information is obtained by records and by voluntary submissions of people and organizations who desire to facilitate identification when the need arises. When a person or organization voluntarily submits information relating to his/her physical and/or behavioral attributes, this is called enrollment with the repository. As will be described more fully below, the manner in which a person enrolls with the repository is important, in that some means of enrollment are more reliable than others. The quality or trust level of enrollment is directly related to the degree of confidence in a conclusion that a person is who he/she purports themselves to be. In other words, if the identification information is submitted to the repository via personal correspondence or via the internet from a personal computer, then the quality of enrollment is low or small. This is because the accuracy of the submitted information cannot be ascertained under these circumstances, in that a person can simply submit false information. It is one feature of the present invention to improve the accuracy by which identification information is received, stored and processed to provide an enhanced probability that a valid match exists between different sets of identification information. This results in a higher degree of confidence that a person is actually who he/she purports to be.

As noted above, enrollment is the official act or process of entering your own name or another person's name on a register or membership list. In the case of a biometric repository described according to the invention, the act of enrollment involves more information than merely one's name. Rather, it might include numerous other items of personal information such as address, telephone number and other such personal information that forms the basis of someone's identity. A biometric repository, identified commercially as the "Global Repository Platform" (hereinafter "GRP"), is described in detail in U.S. Pat. Nos. 5,910,988 and 6,032,137 by Ballard. The subject matter of these patents is incorporated herein by reference. There may be additional "personal" information associated with one's GRP enrollment record—for example such items might include one or more of the following: a driver's license, birth certificate, passport, or other customary identification documents. Once one's identity information is recorded into the GRP, the identity record is permanently associated with the enrollee's biometric data that is also captured at the time of enrollment. The biometric data may include one or more of the following: iris scan, finger scan, facial scan, voice scan, keyboarding scan, or any other suitable biometric attribute that tends to uniquely identify the person. Depending on the enrollment process, some but not all of the biometric data sets may be captured at that time. Over time, as the enrollment data is updated, virtually all the biometric data sets will be acquired or updated.

Once an enrollee is officially enrolled into the GRP, then other data can be associated with the enrollee's information record, ranging from such items as credit card accounts, checking accounts, workplace security enrollments and even travel security enrollments designed to streamline the enrollee's check-in and boarding efforts when flying or using other forms of public transportation where security is a crucial element in gaining access to the transportation services.

When the enrollment has been considered complete, various problems may yet exist or be inherent in the quality of the stored identification information. Once an enrollee is enrolled into the GRP, one may assume the enrollment is completed and ready for use. In fact, the very process of enrollment, as described above, and as is currently envisioned to take place in many commercial and/or governmental applications, can be flawed and fraught with the potential for exacerbating the immense problems and dangers such a system is intended to eliminate, or at least significantly mitigate. Specifically, the enrollment process as described above opens great opportunities to perpetuate identity fraud principally because most of the information that is initially provided in the enrollment process (such as a drivers license, birth certificate, passport, or other such official identity documents), with today's modern, low cost and highly ubiquitous technology, can easily and rapidly be forged with sufficient quality to easily deceive the enrolling agent. Thus, it is possible to link a physical person's biometrics with an identity that may be entirely fabricated or otherwise stolen from the legitimate person that is truly associated with the given identity.

Until a time arrives when a person's identity at birth is biometrically recorded into a GRP type repository and instantly associated with the enrollee's various biometric data sets, there remains a potential to enroll one's self with a false identity. Once an individual is enrolled, they can no longer GRP enroll themselves again as someone else. Since it will take some time in order for the majority of people to become enrolled in the GRP, in the meantime the probability for intentional deceptive enrollments will remain significant. The reason why a subsequent imposter GRP enrollment by the same imposter is not possible is due to a one-to-many search of the enrollee's biometric data which is performed at enrollment time before the enrollment can be considered fully activated. If the imposter enrollee had previously enrolled, their biometric will already be present in the GRP.

In the event a fraudulent GRP enrollment is initiated by an imposter, at some subsequent time after the fraudulent GRP enrollment, the legitimate GRP enrollee (who should have their biometrics linked to their identity within the GRP) may attempt to initiate a legitimate GRP enrollment. The legitimate enrollee will not necessarily realize that their identity had been previously GRP enrolled with the imposter's biometrics. At such time, the legitimate GRP enrollee will have to sort out the enrollment and confirm their true identity to the GRP enrolling agent or authority to make sure they are legitimately GRP enrolled from that point forward. At such time, the imposter, as previously noted, would no longer be able to fraudulently enroll as anyone else because their original fraudulent enrollment is permanently retained in the GRP as a failsafe measure to prevent future imposter enrollments by the same physical individual. Therefore, should the imposter enrollee attempt a subsequent GRP enrollment or pursue an identity authentication, the imposter would be instantly identified as a prior fraudulent GRP enrollee and be subject to such disciplinary action as deemed necessary by the appropriate authorities.

The goal for the legitimate GRP enrollee is to initially enroll with highest possible GRP enrollment quality trust level, and then elevate that trust level in order to enjoy higher credit lines, larger transaction values and increased security levels that facilitate all manner of access and security supported applications. The basic methods to elevate an enrollee's trust level fall into two categories:

1. Passive-one's enrollment level can be elevated by examining a matrix of factors such as:
    a. length of time as a GRP enrollee,
    b. number of validations during the GRP enrollment lifetime,
    c. type, number and success of transactions performed during validations, for example, a GRP enrollee score may have the following information:
        i. GRP life time: 2 years, 4 months, 22 days
        ii. validations breakdown:
            1. credit card transactions:
                >2,454 transactions
                >34 chargebacks
                >3 non-GRP enrollee frauds
                (the following are additional categories of transactions)
            2. checking
            3. debit
            4. airport check-in, etc.
    d. transaction success scoring—based upon analyzing the above matrix, an overall score can be delivered and used to elevate the enrollment quality. Regardless of how good this score is, the original GRP enrollment trust level based on a "GRP Enrollee Presence" of "Not Present" should never be elevated to a GRP trust level that is based upon a "GRP Enrollee Presence" of "Present." Such a status can only be achieved by an Active GRP enrollee trust elevation described below.
2. Active—this is where the GRP enrollee proactively seeks to elevate their GRP trust level by any one of various methods to attain a trust level with a "GRP Enrollee Presence" of "Present" status, as described below.

In order to address the issues described above, a system according to the invention should preferably be established to instantly report an enrollment quality level for a given enrollee each time a GRP identity authentication session is attempted within the context of a scenario where a biometric is acquired to authenticate the enrollee. In this scenario, certain business and/or security rules would take effect based upon the returned "enrollment quality trust level." For example, such circumstances might vary in scope ranging from whether to approve a financial transaction, such as a credit card purchase, permitting someone to log onto a computer or enterprise company network, board an aircraft or open a door to a highly secure area in a building. The possible situations and permutations of such situations are limitless and will affect virtually every aspect of a person's public life, from making daily purchases or unlocking an office door.

The preferred embodiment of the invention provides for the assignment of a "GRP enrollment trust level." This is hierarchical in nature for attaining a cumulative trust level, as described below. An additional component of the GRP enrollment trust level involves a GRP enrollment session administrator, namely, the person that administers the GRP enrollee candidate's enrollment session. This person must hold at least a GRP enrollment trust level S-1 or higher, and in all "S" series enrollment sessions and above, the GRP enrollment administrator must hold an GRP enrollment trust level that is equal to or greater than the GRP enrollment trust level that is being administered. In other words, the administrator must have some certification level that insures that he/she is reliable and trustworthy for entering the identification information into the GRP. As noted below, the various trust levels are arbitrarily designated as "B" (bronze), "S" (silver), "G" (gold) and "P" (platinum), etc.

| GRP Enrollment | Trust Level |
|---|---|
| Enrollment Pending - In process<br>GRP Enrollee Presence - N/A<br>Level Description: | 0 |

The enrollment process has been initiated, relevant identity documentation and/or challenge questions or other identity validation queries have been submitted - all of which are pending the confirmation that the enrollee candidate's biometrics are not already in the GRP.
Level Comments:

If the enrollee's biometrics have been previously enrolled into the GRP, it would be highly likely the enrollee candidate is in the act of committing identity enrollment fraud by attempting to enroll into the GRP as a different person, as compared to their original or previous GRP enrollment. It is for this reason that absolutely no transactions or security oriented applications accept a trust level 0 response for any purpose whatsoever. Therefore, the basic "Pass/Fail" criteria of trust level 0 is that the enrollee candidate's biometrics are not already in the GRP. If that is the case, then the subsequent enrollment levels below overlay on trust level 0 to fully establish the precise nature of trust level assigned to the GRP enrollee.

| Enrollment Level- Bronze-1<br>GRP Enrollee Presence - Not Present<br>Level Description: | B-1 |

Having attained trust level 0, the enrollee candidate is considered enrolled, but no challenge questions or other identify validations were satisfied.
Level Comments:

There is no assurance that the enrollee is in fact the actual biological individual they represent themselves to be at enrollment. At the time of enrollment, by definition, no physical identification documents are presented due to the process being on-line over the internet. Such an enrollment must be treated with extreme caution and be offered the most limited levels of credit and/or security access.

| Enrollment Level-Bronze-2<br>GRP Enrollee Presence Not Present<br>Level Description: | B-2 |

Having attained trust level 0, the enrollee candidate is now considered enrolled, having answered certain challenge questions and/or by having provided other information designed to establish their identity.
Level Comments:

Building upon the GRP enrollment trust level of B-1, in trust level B-2, a series of enrollee specific challenge questions are presented and answered to a satisfactory level sufficient to establish that the GRP enrollee candidate spontaneously provides answers to specific personal background questions which are not readily available to the general public. As in level B-1, the GRP enrollee candidate is now considered enrolled. However, level B-2 confers an additional layer of identity confidence based upon the additional limited informational assurance associated with attaining level B-2. Notwithstanding, even at level B-2, the possibility remains that the GRP enrollee may very well be an imposter that had obtained above-average informational knowledge related to the individual being impersonated. A level B-2 enrollment means that from a financial risk management view or security threat assessment view, the identity is not necessarily valid.

| Enrollment Level-Bronze-X<br>GRP Enrollee Presence - Not Present<br>Level· Description: | B-X |

In addition to satisfying trust level 0 that the enrollee candidate is now considered enrolled, the GRP enrollee has answered certain challenge questions and/or provided additional information designed to establish their true identity.
Level Comments:

The "X" in level B-X, is used to denote that there are various possible level B enrollments beyond "2" that represent permutations or evolutionary improvements in the GRP enrollment process. Again, it should be noted that the basic GRP enrollment trust level "B" means the GRP enrollee candidate was never actually physically present, but rather enrolled into the GRP via the internet or some other scenario where the physical present of the GRP enrollee candidate could not be validated by an appropriate GRP enrollment authority or agent.

| Enrollment Level-Silver-X<br>GRP Enrollee Presence - Present<br>Level Description: | S-X |

In addition to satisfying trust level 0 that the enrollee candidate is now considered enrolled, the GRP enrollee has answered certain challenge questions and/or

| GRP Enrollment | Trust Level |
|---|---|
| provided additional information designed to establish their identity in the presence of an authorized GRP enrollment agent.<br>Level Comments: | |
| The GRP enrollee candidate is physically present before an authorized GRP enrollment administrator. The enrollment administrator may located at a consumer courtesy counter of a grocery store, consumer outlet store or financial institution. In all instances, the "S" level GRP enrollment administrator must hold a GRP enrollment trust level equal to or higher than the trust level that the GRP Enrollee Candidate is seeking to attain. For all "S" series GRP trust level enrollment sessions, the GRP enrollee candidate must successfully answer a sufficient number of identity validation challenge questions along with providing hardcopy identity documentation that is imaged for retention as part of GRP enrollee candidate's permanent GRP record. As part of the GRP enrollment session, the GRP enrollment administrator's trust level and identity are recorded as part of the GRP enrollee candidate's GRP enrollment record. This affords an additional level of an audit trail. The GRP enrollment "S" series trust level enables a higher degree of confidence than a "B" trust level of the GRP enrollee's identity, and when applied to appropriate business and security rules will enable higher credit lines, higher value transactions and higher security access than would otherwise be possible with GRP enrollment level B enrollments. While the enrollee candidate's mandatory physical presence enhances trustworthiness, and the presentation of physical identity documentation (depending on the type and number of documents and the document image capture technology), can facilitate the validation of the documents, there remains the distinct possibility that the "authentic identity" documents could still be fraudulently obtained and presented. Consequently, all level S enrollments must still be treated with caution when applied to higher value financial transactions and when high security access is considered. | |
| Enrollment Level - Gold-X<br>In addition to all GRP level S enrollment criteria described above, GRP enrollment level G must be performed by reputable third party investigative or consulting organizations where the individual level G GRP enrollment administrator is certified to conduct an extensive background checking process. This may consist of numerous degrees of documentation production, analysis and validation along with extensive personal background checks that include all manner and degrees of in-person or telephonic interviews of individuals having personal knowledge of the GRP enrollee candidate. | G-X |
| Enrollment - Platinum-X<br>In addition to all GRP level G enrollment criteria described above, GRP enrollment level P must be performed by approved governmental law enforcement authorities and agencies (such as the FBI) where the individual level P GRP enrollment administrator is certified to conduct an extensive background checking process. This may consist of numerous degrees of documentation production, analysis and validation along with extensive personal background checks that include all manner and of in-person or telephonic interviews of individuals having personal knowledge of the GRP enrollee candidate. | P-X |

Beginning with the trust level B-1 as the least secure enrollment, there is a progression to increasing values designating improved cumulative enrollment quality trust levels, based upon ongoing efforts or means to continuously improve the probability that a given enrollee is truly who they represent themselves to be.

Most initial enrollments will, in all likelihood, be of the most basic in nature. These might occur at a commercial establishment or business, such as a grocery store, where the enrollee candidate presents a driver's license as a document to identify themselves. The image of the driver's license is electronically captured, along with certain elements of information which is quickly retrieved and analyzed from existing public information databases. This enrollment would be considered a trust level S-1. As noted above, the S-1 trust level means that it is virtually unusable other than in the lowest identity confidence level requirement scenarios where, for example, a proposed financial transaction value is nominal or the security level is very modest and of no significant concern.

The foregoing sets forth the trust levels associated with the identification information stored in the GRP. The trust levels associated with the stored identification information relate to the degree of confidence that the system provides in ascertaining that the person is who he/she purports themselves to be. The other parameter of vital interest is the quality of the sensor or device used to provide on-site identification of a person in real time. There are traditionally three ways to identify a person:

1. what someone has—the "what" in this instance is known as a "token." A token is a physical object that is carried on the person—ranging from a driver's license, credit card, an identity badge from work, etc. The problem here is when the token is lost or misplaced, the genuine or original token holder cannot perform the action enabled by the token. If the token is stolen or found by a third party, this simultaneously enables the third party to engage in whatever action the genuine use of the token would otherwise provide.
2. what someone knows—the "what" in this instance is often information known only to that individual. The most common examples are a person's pin number used with an ATM card, or a password for computer or Internet access. This information can also be something easy to remember, such as a birth date, mother's maiden name, etc. The danger here is that such "easy to remember" information is also easy to guess. There is even software readily available on the Internet specifically designed to "guess" and derive such "easy to remember" information.
3. who someone is—the operative word here is "who," because it refers to some physical attribute of the person, typically referred to as a biometric attribute. A biometric attribute is something that cannot be misplaced or otherwise be stolen. This is because the "who" is the specific person, and in theory without the specific "person" there is no absolute identification possible.

Both items 1 and 2 above are based upon information, as compared to biometrics. Both items are crucial elements that should be collected from a GRP enrollment candidate. These elements are further defined below:
1. information—what a person knows, specific information about the person being enrolled that helps substantiate identity. This information is primarily comprised of hardcopy identity documents such as a driver's license, birth certificate, passport, etc.
2. biometrics—who a person is, this is a process to identify an individual person via one or more unique human characteristics. This element can be further broken down into two major categories:
   a. behavioral characteristics—such as a person's signature (which is analyzed either as it statically appears after its written, or the manner in which its written, such as the speed of handwriting and other metrics of the signature process itself—all of which are captured on a specialized digital signature capture pad), keyboarding analysis (the manner in which someone types a password, for example, such as the speed of each keystroke, etc.) or voice scan (the manner in which a person creates the sound of a random selection of challenge letters or numbers); or
   b. physical characteristics—this can range from a finger scan, iris scan, retinal scan, vein scan, ear lobe scan, facial scan, or any of a number of other existing or yet to be developed physical biometric analysis technologies.

Once an enrollee candidate's identity information is recorded in the GRP, the identity record is permanently associated with the enrollee's biometric data, which is also captured at the time of enrollment. Depending on the enrollment process, some but not all of the biometric data sets may be captured. However, over time, as the enrollment is updated, virtually all the biometric data sets can be acquired or updated.

With regard to collecting "information," such as submitted identity documents or collecting answers to challenge questions, the accuracy of the information should be verified by careful physical attribute analysis of the submitted documents and by associated derived data that can be confirmed by comparison with various databases designed to validate the information collected from the enrollee candidate.

Various problems can be encountered in collecting biometric information from the enrollee candidate. When collecting biometric information, it is important to foresee not only how biometric technologies evolve, but to also anticipate what form of identity fraud may develop over time to be used to defeat systems such as the GRP. In summary, the GRP identification process is only as good as the biometric information that is being submitted as proof of an enrollee's identity, both at enrollment time as well as during subsequent identity validation sessions. In theory, if an enrollee imposter were to devise a technique to accurately capture a genuine enrollee's biometric information, and subsequently, fraudulently submit that same biometric information to the GRP, the result would always be "this enrollee is the valid person," when in fact that would not be the case. Such an attack is referred to as a biometric spoofing session.

The imposter scenario illustrates that regardless of the security of the GRP data center and accompanying communication networks, an obvious security gap in the proposed embodiment exists. This is especially true if a GRP enrollee validation session could be accurately recorded and/or synthetically regenerated and then resubmitted to the GRP at a later time. Such a session would permit an imposter to be validated as a genuine enrollee with impunity. This would compromise the entire commercial, consumer and general security infrastructure that depends on the GRP for inviolate personal identity validation.

Previously proposed solutions to the spoofing attacks rely on the premise that in a real world operating environment, it is highly unlikely that a given biometric session could produce perfect reproductions of prior biometric validation sessions. In other words, when a GRP enrollee submits biometric information, regardless of type, it is virtually impossible that a series of biometric capture sessions would produce identical finger scans, iris scans, facial scans—session to session. Therefore, it is proposed by other approaches, that biometric analytics could embody sophisticated algorithms that would theoretically detect identical session to session biometric submissions. However, imposters skilled in the art of biometrics and computer programming could easily develop algorithms that would subtlely alter submitted biometrics in such a manner that the GRP biometric analytics systems would not easily detect a synthetic biometric session or session spoof.

A proposed solution to this dilemma is to develop a "next generation" biometric sensor architecture specifically designed to thwart such spoofing attacks. As used herein, a biometric sensor is a device that senses and captures physical or behavioral attributes of a person seeking to establish his/her identity. In essence, the goal is to "know" when the GRP is communicating with an external biometric sensor, regardless of the type, and know that the inbound GRP enrollee validation session is in fact a real-time event and not a spoof after-the-fact replay with an imposter attempting to commit a fraud.

In the preferred embodiment of the invention, there is envisioned a biometric sensor trust level ("BST Level") architecture that is similar to the enrollment trust level. The GRP enrollee would be assigned a sensor trust level, depending on the level of enrollment he/she undergoes. Initially, it is assumed that all sensors are at sensor trust level 0, meaning that any session originating with the given biometric sensor device can readily be spoofed. It is further envisioned that as the biometric sensor technology evolves and improves over time, that with each emerging BST Level standard, the numeric trust value would increase—such that the first generation of such sensors would be referred to as having a BST Level of 1.0. The first digit of the BST Level refers to the general capability of the BST Level, and the decimal digit refers to incremental improvements associated with what will invariably be associated with computer software, firmware and hardware bugs.

For example, the first such BST Level compliant sensors will be certified and receive a 1.0 rating, meaning they conform to the basic performance level expected for the standard defined at that time. In the event a bug is discovered with the standard, or some type of incremental improvement is made in the 1.0 level sensors, then appropriately compliant and certified sensors would receive a 1.1 designation, and so on.

The trust level of a biometric sensor or any other authentication sensor is a function of various parameters. One parameter may be the secure type of environment in which the sensor is physically placed. In other words, if the sensor is placed in a guarded and secure environment and where it is supervised by a certified operator, then it can achieve a higher trust level. This may be the case, as the certified operator has control over who can submit biometric information, and how and what the person inputs the biometric data into the sensor. In highly secure environments where people have been pre-screened, there exists a higher degree of confidence that the person submitting the biometric information is who he/she says they are. This type of environmental data concerning the sensor can be embedded in the sensor and transmitted to the authentication system, together with the request to authenticate a biometric input. The environmental data concerning the sensor can be securely embedded in the sensor much like MAC address information in a computer. The type of biometric sensor, namely whether it is an iris or retina scanner, a fingerprint scanner, etc., can be embedded as ID information into the sensor.

The sensors can also be certified as to trust level at the factory to verify the quality of design and accuracy of results. The appropriate certified trust level can also be embedded within the sensor and recalled for transmission with the device ID to the authentication system. The higher the reliability and security of scanning an iris, scanning a retina or finger print, the higher the trust level would be. Obviously, lower quality sensors placed in the public places would be rated with low trust levels, as the authentication information transmitted from the person would be less reliable as to the true identity of the person. Importantly, it is preferred that the sensor trust level be uniform throughout the industry and conform to established standards that may be set. In other words, a sensor trust level of 3.1 represents the same type of sensor, in the same environment, operated by the same type of certified person, in any geographical location. As will be described in more detail below, in order for the authentication system or GRP to provide a score as to the probability of the accuracy of true identification, then the system requires input of information as to the type of sensor involved during the authentication session.

It is envisioned that biometric and other types of sensors will eventually be personalized items. For example, biometric sensors may be built into cell or other wireless type telephones. Since cell phones are presently equipped with image sensors, such sensors can be adapted for use in imaging the biometric attributes of a person in close proximity to the phone. This will facilitate the assurance that a high quality or trust level sensor will be available at any location of interest. In other words, a person may elect to purchase a pre-certified metric sensor having a high trust level. As noted above, the trust level can be permanently fixed in the sensor, such as in the silicon of the sensor circuits. In addition to other sensors that may be permanently fixed at points of entry, there may be available standard interfaces for plugging therein the pre-certified, personal biometric sensors. Thus, a person having a personal sensor can advance in the line and plug in his/her personal biometric sensor, request authentication of his/her identification, and if the response is affirmative, proceed without delay. If the sensor is not a certified sensor, or otherwise cannot be associated with a trust level, the GRP will automatically assume a trust level of zero or near zero.

FIG. 1 illustrates the manner in which the GRP authentication system uses the enrollment quality parameter and the sensor trust level parameter to render a score or response concerning the degree or probability that the person involved in the authentication session is who he/she says they are. The vertical axis of the illustration is numbered to represent the enrollment quality or trust level, as described above. The higher the number, the higher the enrollment quality. The horizontal axis is also numbered to represent the quality or trust level of the sensor device involved. While not shown, there may be a horizontal line for each type of sensor available. The sloped line 10 represents points of correlation between the enrollment trust level and the sensor trust level. The correlation programmed into the GRP results in a slope of the line 10 in the neighborhood of about 40 degrees to 50 degrees, preferably 45 degrees. The sloped line 10 may also be segmented with numbers, starting with zero at the intersection of the axes. The number resulting from the correlation can be the score representative of the probability that the person involved in the authentication session is who he/she purports to be. As an example, if the person involved in the authentication session enrolled in such a manner that the quality was P2, and the person input his/her biometric attributes into a sensor rated with a trust level of 6.0, then the intersection 12 on the sloped line 10 would be at a high score. In the example, the only higher score or probability would be a person enrolled with a trust level of P3, and who input biometric attributes into a sensor having a trust level of 6.1. Depending on particular situations, the line 10 may not be linear, but may take on non-linear characteristics.

Figure 2:
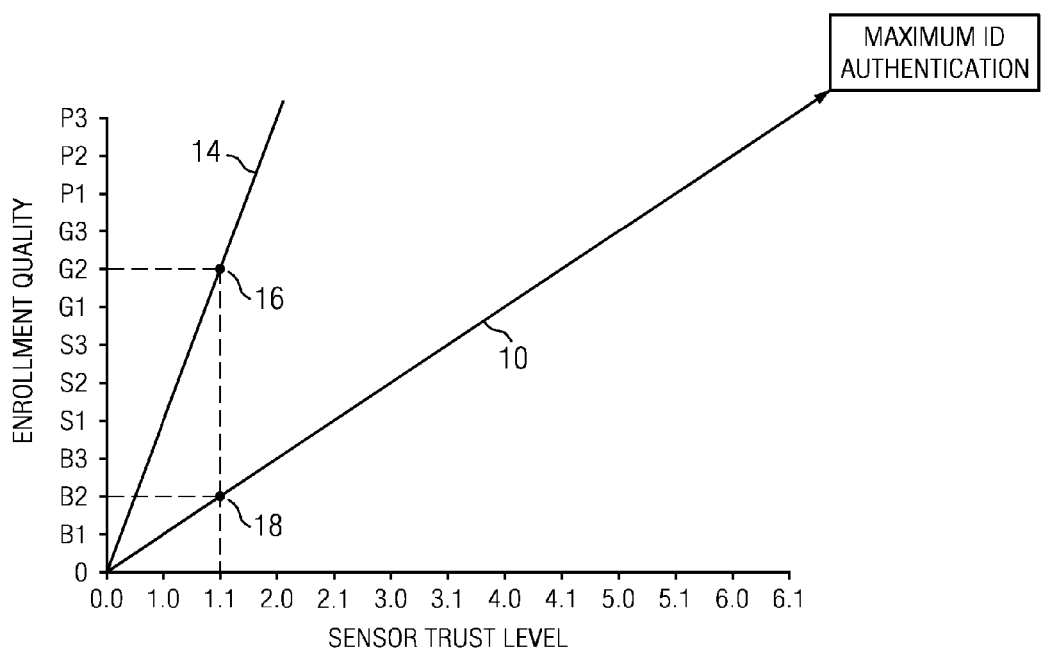
FIG. 2 graphically depicts a variation of FIG. 1, where the enrollment quality is high, but the sensor trust level is low, thereby yielding a low score.

As another example, shown in FIG. 2, if a person was enrolled with the GRP with a trust level of G2, but was involved in a session using a sensor having a lower rated trust level, such as 1.1, then the resulting score 16 on line 14 would not represent a correct correlation. In other words, a high enrollment trust level and a low sensor trust level should not result in a score that is inflated. Rather, the lower of either of the enrollment trust level or the sensor trust level dominates. Thus, in the example, if the sensor trust level involved is only 1.1, then the score 18 can be no greater than if the person had enrolled with a trust level of B2. This is because if low quality sensors are used in an environment that is not operated by certified persons, then an imposter could use a low trust level sensor in order to achieve a high score and try to represent himself/herself to be a person previously enrolled with a high enrollment trust level. The same is also true in situations where high trust level sensors are used and an attempt is made to correlate the same with a low enrollment trust level. The lower trust level dominates. It can be seen that the probability of accurately authenticating a person or object is maximized when the highest trust level sensor is employed and the person was previously enrolled with a high enrollment trust level.

It should be understood that the processing of the trust levels presupposes that there was an acceptable match between the stored enrollment information and the identification data generated during the authentication session. The score generated in accordance with the foregoing can be a number or other value indicating the authentication probability. This value in itself may not be adequate for security persons or merchants to determine whether the person has been adequately authenticated, based on the existing conditions. Thus, the value can be processed by other algorithms to generate a "yes" or "no" response, which is easily understood. The processing of the value can be by the GRP, but may be carried out locally at the merchant or security office, as other variables unique to the situation may be involved. Alternatively, the GRP can conduct some preprocessing and return a "yes" or "no" response together with the score, whereupon the merchant or security office can overrule the response or process it further to refine the final "yes" or "no" result which is coupled to the personnel at the sensor location.

In situations where the level of security changes over time, such as at airports and the like, the same score returned by the GRP may at one time be sufficient to authenticate a person's identity, and at other times of higher security levels, the same score may not be sufficient. This can be adjusted at the local operational level as the need requires, and not with the GRP.

Figure 3:
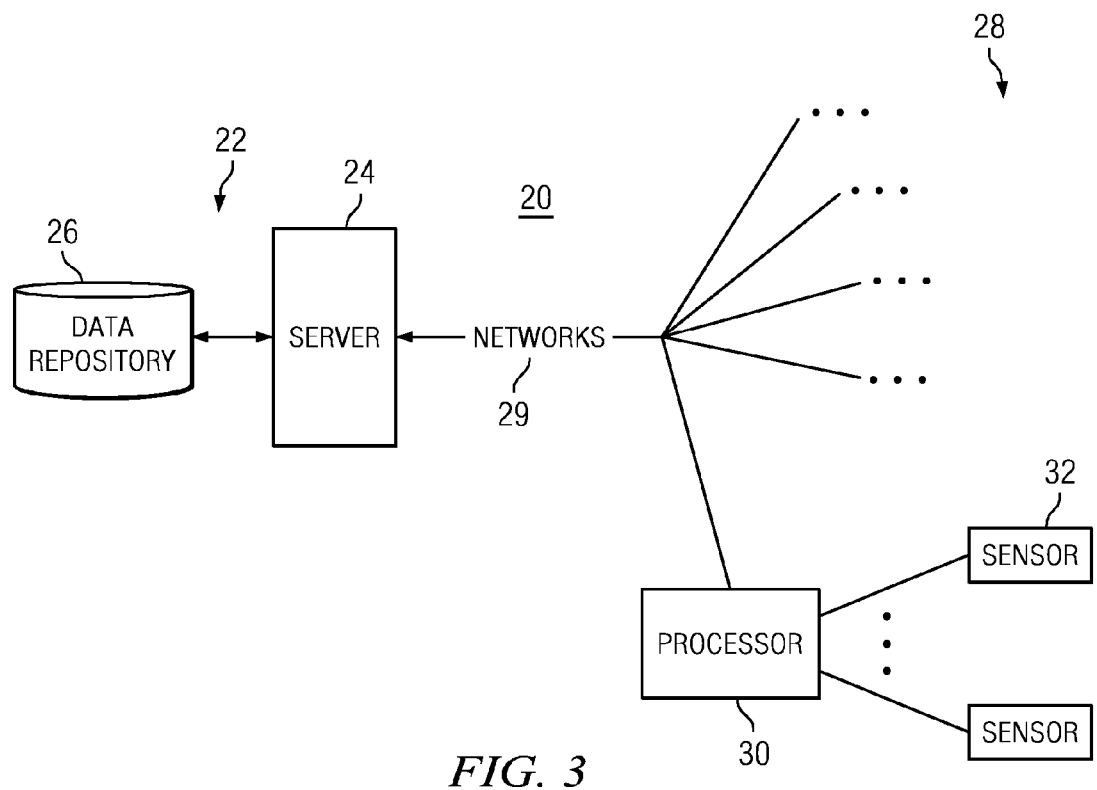
FIG. 3 illustrates an environment in which the invention can be advantageously practiced.

FIG. 3 illustrates an environment 20 in which the invention can be advantageously practiced. A GRP 22 includes, among other items not shown, a server 24 and a relational database 26 storing all of the enrollment information and the sensor information. In practice, the database 26 is duplicated for redundant and reliable operation. The GRP 22 is coupled to a host of remote locations 28 by one or more networks 29, including the Internet, each of which can be wire or wireless networks. The enrollment level feature, the trust level feature and the various features of the invention are contemplated to be implemented in software, firmware and hardware. It is envisioned that the enrollment level feature and the trust level feature may be incorporated in a centralized database 26 and accessible by users around the world through the Internet. The database 26 would, however, be updated only through a highly secure means to prevent fraud.

Located at each remote location is a processor 30 coupled to one or more sensors, one shown as numeral 32. While the preferred embodiment envisions the use of biometric sensors, other non-biometric types of sensors could be readily used with the invention. A sensor can be located at each check-out counter of a commercial retail establishment, at each entrance of a secure office environment, or at entrance locations of an airport. Many other situations can be candidates for use of the invention. The GRP can be a centralized system providing service to a host of remote locations over the United States. The GRP system 20 can be centralized in a large business complex and serve only the needs of the complex. Various business complexes can employ separate GRP systems, and the databases thereof can be shared to maintain the full and updated authentication information.

Figure 4:
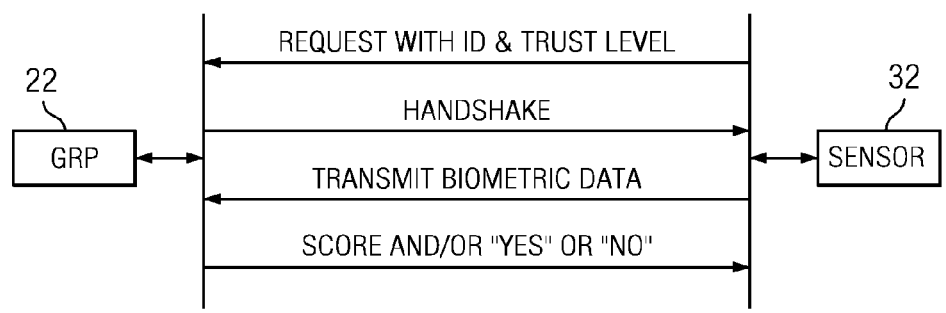
FIG. 4 illustrates the bidirectional communications between the biometric repository and a remote biometric sensor.

FIG. 4 illustrates the rudimentary communications between the GRP 22 and a sensor 32. When it is desired to initiate an identity authentication session, the sensor 32 transmits an encrypted multi-field request, which includes, among other items, the ID, serial number and the trust level of the sensor 32. The ID would identify the type of sensor, namely, an iris scanner, etc. The GRP 22 will transmit to the sensor 32 a handshake signal indicating that a two-way communication channel has been established. The format of transmissions between the GRP 22 and the sensor 32 may include numerous fields of information to assure the security and safety of the communications. One field of data transmitted to the system would contain the name of the person whose identity is to be authenticated. Once the two-way communication channel has been established, the sensor 32 captures the biometric attribute of interest, and transmits the biometric data to the GRP 22. The GRP compares the stored enrollment data of the person involved in the authentication session, with the received biometric data. The system can search the entire database to determine if the received biometric data matches any other biometric data stored in the system. Alternatively, the system can find the stored biometric data associated with the name of the person involved in the session, and conduct a comparison. In any event, a determination is made as to whether there is a sufficient match. The GRP processes the enrollment data trust level with the trust level of the sensor 32, to provide the probability of identity authentication of the person, all as described above. In other words, a positive match or conclusion of the biometric data may yield a "yes" answer, but the affirmative answer may have been a result of poor data. Thus, the processing of the trust levels provides information concerning how accurate the conclusion was, based on the quality of data available. When the score of the person has been determined by the GRP 22, such information is transmitted in an encrypted manner to the site of the sensor 32. The sensor 32 can be equipped with a display to show whether the identity authentication has been successful, or not. If the session was not successful, then another biometric sensor may be involved to provide biometric information of another type. This second attempt with a different biometric attribute can be used to provide identity authentication.

The foregoing is described in connection with the authentication of the identity of a person. However, the principles and concepts of the invention can be employed to provide authentication of objects other than human beings. The identity authentication techniques of the invention can be applied to animals, documents, art works, and a host of other objects having inherent unique and distinguishing features.

While the present invention has been described above in connection with various embodiments, it is to be understood that the disclosure has been made by way of example only, as many changes in detail and structure may be made to the invention with out departing from the spirit and scope of the invention, as defined by the appended claims.

What is claimed is:

1. A method of forming a biometric repository to prevent imposter activity, comprising:
   forming in a database of a computer system an enrollment structure, said enrollment structure having a hierarchy of quality levels, each quality level having data identifying one or more aspects or features of a person, where the features of a person is more comprehensive and detailed as the level increases in the hierarchy, whereby the assurances that a person is who he/she says they are increases;
   forming in the database, a hierarchy of trust levels, each trust level storing one or more sets of biometric data of a person, whereby, as the trust level increases in the hierarchy, the assurances that the person is who he/she says they are increases;
   using the quality level in the enrollment structure and the trust level of the biometric data in the database to provide a score relating to said assurances; and
   defining the score to be no larger than either the quality level in the enrollment structure or the trust level of the biometric data in the database.

2. The method of claim 1, further comprising:
   using corresponding quality levels in the enrollment structure and trust levels of the biometric data in the database as a measure in determining with a predetermined assurance that the person is not an imposter.

* * * * *